US009860735B2

(12) United States Patent
Arzelier et al.

(10) Patent No.: US 9,860,735 B2
(45) Date of Patent: Jan. 2, 2018

(54) METHODS AND APPARATUS FOR USE IN COMMUNICATING SUPPLEMENTAL NON ACCESS STRATUM (NAS) INFORMATION

(75) Inventors: Claude Jean-Frederic Arzelier, Cannes (FR); Rene Faurie, Courbevoie (FR); Richard Charles Burbidge, Slough (GB)

(73) Assignee: BlackBerry Limited, Waterloo, Ontario (CA)

( * ) Notice: Subject to any disclaimer, the term of this patent is extended or adjusted under 35 U.S.C. 154(b) by 995 days.

(21) Appl. No.: 13/282,716

(22) Filed: Oct. 27, 2011

(65) Prior Publication Data

US 2013/0051315 A1 Feb. 28, 2013

(30) Foreign Application Priority Data

Aug. 22, 2011 (EP) .................................... 11178358

(51) Int. Cl.
*H04W 8/06* (2009.01)

(52) U.S. Cl.
CPC ..................... *H04W 8/06* (2013.01)

(58) Field of Classification Search
CPC ...................................................... H04W 8/06
USPC ............................. 370/328; 455/436, 456.1
See application file for complete search history.

(56) References Cited

U.S. PATENT DOCUMENTS

| | | | |
|---|---|---|---|
| 6,775,687 B1 | 8/2004 | Binding et al. | |
| 8,032,164 B2 | 10/2011 | Aghili et al. | |
| 2005/0003831 A1* | 1/2005 | Anderson | 455/456.1 |
| 2007/0224990 A1* | 9/2007 | Edge et al. | 455/436 |
| 2007/0297367 A1* | 12/2007 | Wang | H04L 63/0414 370/331 |
| 2009/0042576 A1 | 2/2009 | Mukherjee et al. | |
| 2009/0156213 A1* | 6/2009 | Spinelli et al. | 455/436 |
| 2010/0085962 A1* | 4/2010 | Issaeva et al. | 370/355 |
| 2011/0113157 A1 | 5/2011 | Kim et al. | |
| 2011/0159895 A1* | 6/2011 | Arzelier et al. | 455/466 |
| 2012/0113895 A1* | 5/2012 | Diachina et al. | 370/328 |

FOREIGN PATENT DOCUMENTS

| | | |
|---|---|---|
| EP | 2315373 A2 | 4/2011 |
| WO | 2008116128 A2 | 9/2008 |
| WO | 2010091123 A1 | 8/2010 |
| WO | 2010091594 A1 | 8/2010 |

(Continued)

OTHER PUBLICATIONS

PCT Search Report & Written Opinion for PCT Application # PCT/EP2012/066335, dated Nov. 8, 2012.

(Continued)

*Primary Examiner* — Jeffrey M Rutkowski
*Assistant Examiner* — Mandish Randhawa
(74) *Attorney, Agent, or Firm* — Trop Pruner & Hu, P.C.

(57) ABSTRACT

Techniques for use in the communication of supplemental non access stratum (NAS) information in a network are described. In one illustrative example, a mobile device operates to send to a network an initial NAS message associated with a NAS procedure. The mobile device further operates to send to the network a supplemental NAS message associated with the NAS procedure, where the supplemental NAS message includes supplemental NAS information. Several related and alternative techniques are provided.

20 Claims, 8 Drawing Sheets

(56) References Cited

FOREIGN PATENT DOCUMENTS

WO      2010117761 A1    10/2010
WO      2011083151 A1     7/2011

OTHER PUBLICATIONS

"Radio Connection Establishment", 3GPP Draft, R2-063175 discussion on connection establishment, 3rd Generation Partnership Project (3GPP), Mobile Competence Centre, Nov. 1, 2006, pp. 1-8, Sophia-Antipolis Cedex, France.
European Patent Office, Search Report and Opinion, Application No. 11178358.5, dated Feb. 21, 2012.
PCT International Preliminary Report on Patentability, Application No. PCT/EP2012/066335, dated Mar. 6, 2014.
3rd Generation Partnership Project; Technical Specification Group Core Network and Terminals; Mobile Radio Interface Layer 3 Specification; Core Network Protocols; Stage 3 (Release 10), 3 GPP TS 24.008 V10.6.1 (Mar. 2012), Copyright 2012 3GPP Organizational Partners.
TSG-RAN Working Group 3 Meeting #7 (TSGR3#7(99)B55), entitled "Security Mode Control Procedure for RANAP," dated Sep. 1999 (8 pages).
3GPP TS 44.006 V10.0.0, Technical Specification, 3rd Generation Partnership Project; Technical Specification Group GSM/EDGE Radio Access Network; Mobile Station—Base Station System (MS—BSS) interface;Data Link (DL) layer specification (Release 10) Mar. 2011 (60 pages).

\* cited by examiner

METHODS AND APPARATUS FOR USE IN COMMUNICATING SUPPLEMENTAL NON ACCESS STRATUM (NAS) INFORMATION

CROSS-REFERENCE TO RELATED APPLICATION

This patent application claims priority to European Patent Application having application number 11178358.5 and filing date of 22 Aug. 2011, which is hereby incorporated by reference herein.

BACKGROUND

Field of the Technology

The present disclosure relates generally to mobile communication devices operating in wireless communication networks, and more particularly to the communication of non access stratum (NAS) information in such wireless communication networks.

Description of the Related Art

In order to establish a circuit-switched session in a GSM/EDGE Radio Access Network (GERAN), a mobile device is required to send a message for requesting service or access to a core network. The message indicates the purpose of the session establishment to non access stratum (NAS) layer, and may be referred to as an initial NAS message. The initial NAS message includes NAS information to be used by the network for performing the associated procedure(s). The initial NAS message is relayed to the core network through the access network and is limited in size due to restrictions of use of the data link layer protocol in the GERAN. For that reason, it is not feasible to simply add further NAS information that would be useful or required for future enhancements. Other networks and environments may have the same or similar deficiencies.

Accordingly, what are needed are methods and apparatus to overcome these and similar deficiencies of the prior art.

BRIEF DESCRIPTION OF THE DRAWINGS

Embodiments of present invention will now be described by way of example with reference to attached figures, wherein.

DETAILED DESCRIPTION OF THE PREFERRED EMBODIMENTS

Techniques for use in the communication of supplemental non access stratum (NAS) information in a network are described herein. In one illustrative example, a mobile device operates to send to a network a NAS message associated with a NAS procedure. The mobile device further operates to send to the network a supplemental NAS message associated with the NAS procedure. The communication of the supplemental NAS message may be conditioned to whether supplemental NAS messaging is allowed or supported by the network. Several related and alternative techniques are provided.

Figure 1:
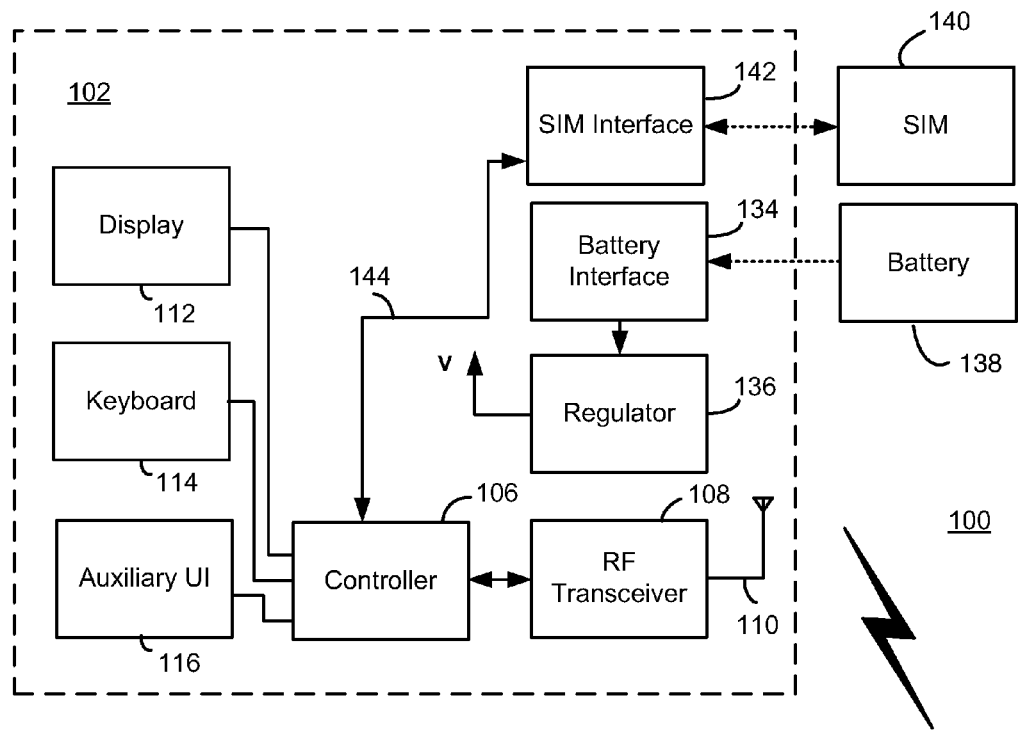
FIG. 1 is a block diagram which illustrates pertinent components of a mobile communication device and a wireless communication network.
Figure 1:
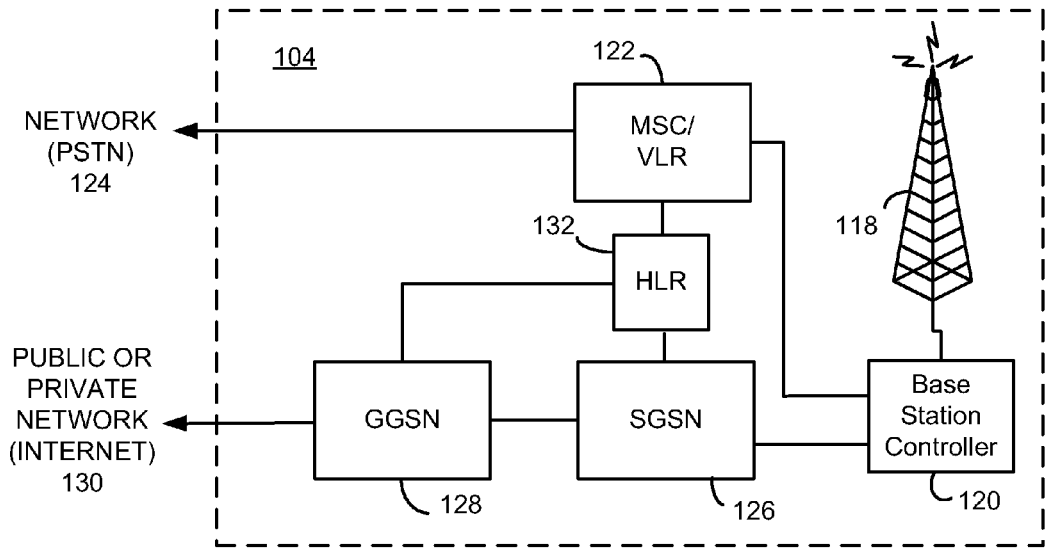

To illustrate an exemplary environment for practicing the techniques of the present disclosure, FIG. 1 is a block diagram of a communication system 100 which includes a mobile communication device 102 which communicates in a wireless communication network 104. Mobile device 102 preferably includes a visual display 112, a keyboard 114, and perhaps one or more auxiliary user interfaces (UI) 116, each of which are coupled to a controller 106. Controller 106 is also coupled to radio frequency (RF) transceiver circuitry 108 and an antenna 110. Typically, controller 106 is embodied as a central processing unit (CPU) which runs operating system software in a memory component (not shown). Controller 106 will normally control overall operation of mobile device 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile device 102, information for transmission to network 104, a telephone number to place a telephone call, commands to be executed on mobile device 102, and possibly other or different user inputs.

Mobile device 102 sends communication signals to and receives communication signals from network 104 over a wireless link via antenna 110. RF transceiver circuitry 108 performs functions similar to those of a base transceiver station (BTS) 118 and a base station controller (BSC) 120 (described later below), including for example modulation/demodulation and possibly encoding/decoding and encryption/decryption. It is contemplated that RF transceiver circuitry 108 may perform certain functions in addition to those performed by BTS 118/BSC 120. It will be apparent to those skilled in art that RF transceiver circuitry 108 will be adapted to particular wireless network or networks in which mobile device 102 is intended to operate.

BTS 118 and BSC 120 may be referred to as a base station subsystem (BSS) and part of the radio access network (RAN). BSC 120 is associated with a GSM/EDGE Radio Access Network (GERAN) system, but other networks nodes such as radio network controller (RNC) or E-UTRAN Node_B (eNB) may be employed for UMTS or LTE, respectively. Others networks, not necessarily conforming to 3GPP standards, for example, networks conforming to IEEE or IETF standards, may alternatively be utilized.

Mobile device 102 includes a battery interface 134 for receiving one or more rechargeable batteries 138. Battery 138 provides electrical power to electrical circuitry in mobile device 102, and battery interface 134 provides for a mechanical and electrical connection for battery 138. Battery interface 134 is coupled to a regulator 136 which regulates power to the device. Mobile device 102 may be a handheld portable communication device, which includes a housing (e.g. a plastic housing) which carries and contains the electrical components of mobile device 102 including battery 138. Mobile device 102 operates using a Subscriber Identity Module (SIM) or Universal SIM (USIM) 140 which is connected to or inserted in mobile device 102 at a SIM or USIM interface 142. SIM/USIM 140 is one type of a conventional "smart card" used to identify an end user (or subscriber) of mobile device 102 and to personalize the device, among other things. By inserting SIM/USIM 140 into mobile device 102, an end user can have access to any and all of his/her subscribed services. SIM/USIM 140 generally includes a processor and memory for storing information. Since SIM/USIM 140 is coupled to SIM/USIM interface 142, it is coupled to controller 106 through communication lines 144. In order to identify the subscriber, SIM/USIM 140 contains some user parameters such as an International Mobile Subscriber Identity (IMSI). An advantage of using SIM/USIM 140 is that end users are not necessarily bound by any single physical mobile device. SIM/USIM 140 may store additional user information for the mobile device as well, including datebook (or calendar) information and recent call information.

Mobile device 102 may consist of a single unit, such as a data communication device, a cellular telephone, a multiple-function communication device with data and voice communication capabilities, a personal digital assistant (PDA) enabled for wireless communication, or a computer incorporating an internal modem. Preferably, as mentioned earlier, mobile device 102 is a handheld portable communication device which includes a housing (e.g. a plastic housing) which carries and contains the electrical components of mobile device 102. Alternatively, mobile device 102 may be a multiple-module unit comprising a plurality of separate components, including but in no way limited to a computer or other device connected to a wireless modem. In particular, for example, in the mobile device block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile device 102 may have a more particular implementation as described later in relation to mobile device 202 of FIG. 2.

Mobile device 102 communicates in and through wireless communication network 104. Wireless communication network 104 may be a cellular telecommunications network. In the embodiment of FIG. 1, wireless network 104 is configured in accordance with General Packet Radio Service (GPRS) and a Global System for Mobile communications (GSM) technologies. Today, such a mobile device may further operate in accordance with Enhanced Data rates for GSM Evolution (EDGE) or Enhanced GPRS (EGPRS). In such environment, wireless network 104 includes BSC 120 with associated BTS 118, a Mobile Switching Center (MSC) 122, a Home Location Register (HLR) 132, a Serving General Packet Radio Service (GPRS) Support Node (SGSN) 126, and a Gateway GPRS Support Node (GGSN) 128. MSC 122 is coupled to BSC 120 and to a landline network, such as a Public Switched Telephone Network (PSTN) 124. SGSN 126 is coupled to BSC 120 and to GGSN 128, which is in turn coupled to a public or private data network 130 (such as the Internet). HLR 132 is coupled to MSC 122, SGSN 126, and GGSN 128.

BTS 118 is a fixed transceiver station, and BTS 118 and BSC 120 may together be referred to as a base station subsystem (BSS). The BSS provides wireless network coverage for a particular coverage area commonly referred to as a "cell". The BSS transmits communication signals to and receives communication signals from mobile devices within its cell via station 118. The BSS normally performs such functions as modulation and possibly encoding and/or encryption of signals to be transmitted to the mobile device in accordance with particular, usually predetermined, communication protocols and parameters, under control of its controller. The BSS similarly demodulates and possibly decodes and decrypts, if necessary, any communication signals received from mobile device 102 within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and mobile device 102. An RF channel is a limited resource that must be conserved, typically due to limits in overall bandwidth and a limited battery power of mobile device 102. Those skilled in art will appreciate that a wireless network in actual practice may include hundreds of cells, each served by a station 118 (i.e. or station sector), depending upon desired overall expanse of network coverage. All pertinent components may be connected by multiple switches and routers (not shown), controlled by multiple network controllers.

For all mobile device's 102 registered with a network operator, permanent data (such as mobile device 102 user's profile) as well as temporary data (such as mobile device's 102 current location) are stored in HLR 132. In case of a voice call to mobile device 102, HLR 132 is queried to determine the current location of mobile device 102. A Visitor Location Register (VLR) of MSC 122 is responsible for a group of location areas and stores the data of those mobile devices that are currently in its area of responsibility. This includes parts of the permanent mobile device data that have been transmitted from HLR 132 to the VLR for faster access. However, the VLR of MSC 122 may also assign and store local data, such as temporary identifications. Optionally, the VLR of MSC 122 can be enhanced for more efficient co-ordination of GPRS and non-GPRS services and functionality (e.g. paging for circuit-switched calls which can be performed more efficiently via SGSN 126, and combined GPRS and non-GPRS location updates).

Serving GPRS Support Node (SGSN) 126 is at the same hierarchical level as MSC 122 and keeps track of the individual locations of mobile devices. SGSN 126 also performs security functions and access control. Gateway GPRS Support Node (GGSN) 128 provides interworking with external packet-switched networks and is connected with SGSNs (such as SGSN 126) via an IP-based GPRS backbone network. SGSN 126 performs authentication and cipher setting procedures based on algorithms, keys, and criteria (e.g. as in existing GSM). In conventional operation, cell selection may be performed autonomously by mobile device 102 or by the transceiver equipment instructing mobile device 102 to select a particular cell. Mobile device 102 informs wireless network 104 when it reselects another cell or group of cells, known as a routing area.

In order to access GPRS services, mobile device 102 first makes its presence known to wireless network 104 by performing what is known as a GPRS "attach". This operation establishes a logical link between mobile device 102 and SGSN 126 and makes mobile device 102 available to receive, for example, pages via SGSN, notifications of incoming GPRS data, or SMS messages over GPRS. In order to send and receive GPRS data, mobile device 102 assists in activating the packet data address that it wants to use. This operation makes mobile device 102 known to GGSN 128; interworking with external data networks can thereafter commence. User data may be transferred transparently between mobile device 102 and the external data networks using, for example, encapsulation and tunneling. Data packets are equipped with GPRS-specific protocol information and transferred between mobile device 102 and GGSN 128.

Figure 2:
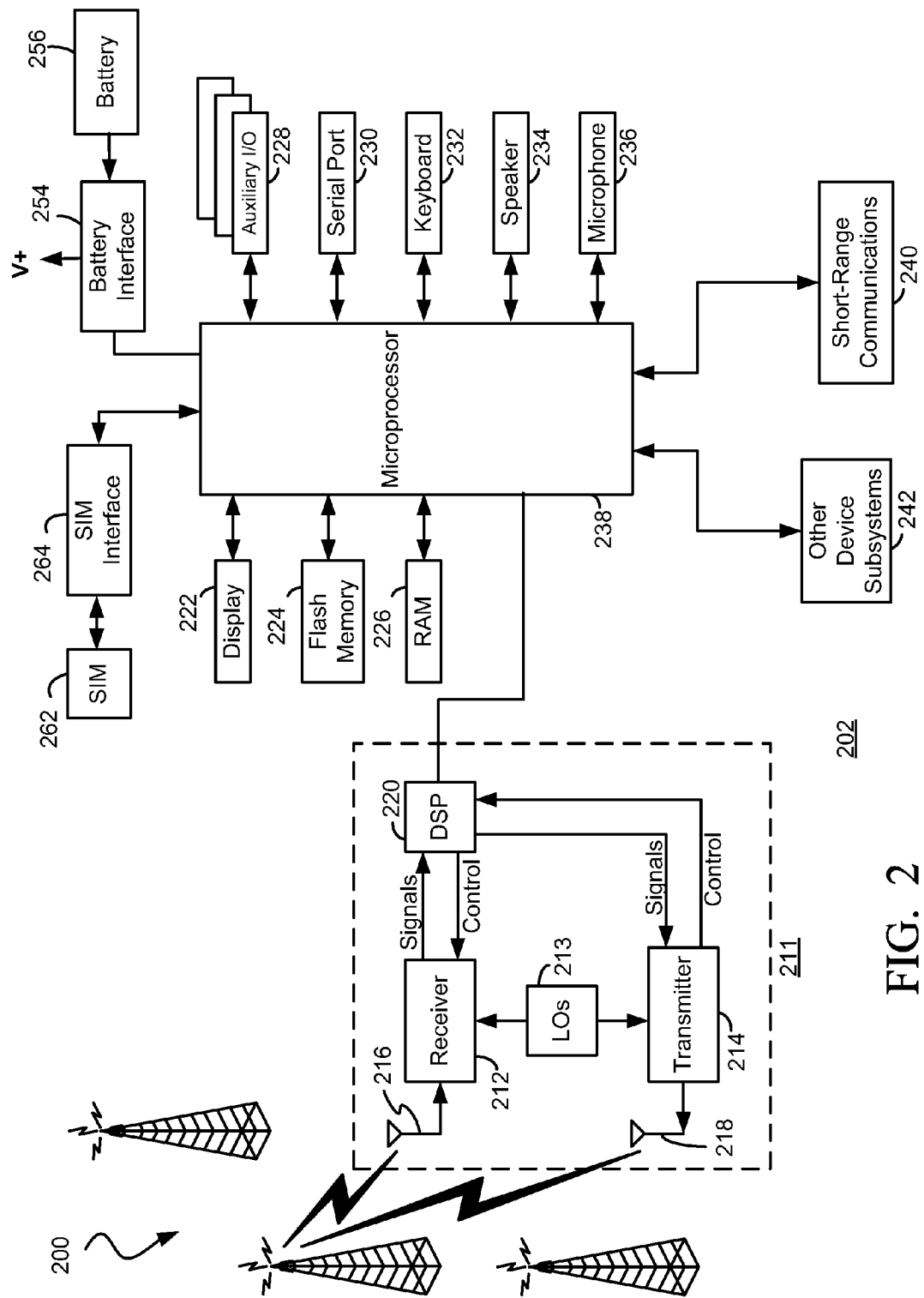
FIG. 2 is a more detailed diagram of one type of mobile device of FIG. 1.

FIG. 2 is a detailed block diagram of one type of mobile device 202 of the present disclosure, which may be referred to as a mobile station (MS), mobile equipment (ME), a user equipment (UE), or the like. Mobile device 202 is preferably a two-way communication device having at least voice and advanced data communication capabilities, including the capability to communicate with other computer systems. Depending on the functionality provided by mobile device 202, it may be referred to as a data messaging device, a two-way pager, a cellular telephone with data messaging capabilities, a wireless Internet appliance, or a data communication device (with or without telephony capabilities). Mobile device 202 may communicate with any one of a plurality of fixed transceiver stations 200 within its geographic coverage area.

Mobile device 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile device 202 is intended to operate.

Mobile device 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile device 202, and therefore mobile device 202 may utilize a Subscriber Identity Module or "SIM" or Universal SIM "USIM" card 262 to be inserted in a SIM/USIM interface 264 in order to operate in the network. SIM/USIM 262 includes those features described in relation to FIG. 1. Mobile device 202 is a battery-powered device so it also includes a battery interface 254 for receiving one or more rechargeable batteries 256. Such a battery 256 provides electrical power to most if not all electrical circuitry in mobile device 202, and battery interface 254 provides for a mechanical and electrical connection for it. The battery interface 254 is coupled to a regulator (not shown) which provides a regulated voltage to all of the circuitry.

Mobile device 202 includes a microprocessor 238 (which is one implementation of controller 106 of FIG. 1) which controls overall operation of mobile device 202. Communication functions, including at least data and voice communications, are performed through communication subsystem 211. The communication techniques of the present disclosure may generally be controlled by microprocessor 238 in connection with DSP 220. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a non-volatile storage device such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile device 202. A predetermined set of applications which control basic device operations, including at least data and voice communication applications, will normally be installed on mobile device 202 during its manufacture. A preferred application that may be loaded onto mobile device 202 may be a personal information manager (PIM) application having the ability to organize and manage data items relating to user such as, but not limited to, e-mail, calendar events, voice mails, appointments, and task items. Naturally, one or more memory stores are available on mobile device 202 and SIM 256 to facilitate storage of PIM data items and other information. The PIM application preferably has the ability to send and receive data items via the wireless network. In the present disclosure, PIM data items are seamlessly integrated, synchronized, and updated via the wireless network, with the mobile device user's corresponding data items stored and/or associated with a host computer system thereby creating a mirrored host computer on mobile device 202 with respect to such items. This is especially advantageous where the host computer system is the mobile device user's office computer system. Additional applications may also be loaded onto mobile device 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile device 202 and may provide enhanced on-device functions, communication-related functions, or both. These applications will be described later in relation to FIG. 5 below.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile device 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211. For voice communications, the overall operation of mobile device 202 is substantially similar, except that the received signals would be output to speaker 234 and signals for transmission would be generated by microphone 236. Alternative voice or audio I/O subsystems, such as a voice message recording subsystem, may also be implemented on mobile device 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile device 202 by providing for information or software downloads to mobile device 202 other than through a wireless communication network. The alternate download path may, for example, be used to load an encryption key onto mobile device 202 through a direct and thus reliable and trusted connection to thereby provide secure device communication. Short-range communications subsystem 240 of FIG. 2 is an additional optional component which provides for communication between mobile device 202 and different systems or devices, which need not necessarily be similar devices.

For establishing a GSM circuit-switched session in a GSM/EDGE Radio Access Network (GERAN), a mobile device is required to send a message for requesting service or access. Such requirements are detailed in 3$^{rd}$ Generation Partnership Project (3GPP) Technical Specifications (TS) 44.018 and 24.008, for example. This message indicates the purpose of the session establishment to the non access stratum (NAS) layer, and may be referred to as a NAS message. The purpose of the session establishment may be for one of a number of different possibilities, such as for a mobile originating call, an answer to paging, a location update, etc. Examples of initial NAS messages include Location Updating Request messages, CM Re-establishment Request messages, CM Service Request messages, Paging Response messages, IMSI Detach Indication messages, Notification Response messages, and Immediate Setup messages.

The NAS layer is a functional layer in the wireless telecommunication protocol stack comprising protocols operating between the core network and the mobile device. The NAS layer supports signaling and traffic between the core network and the mobile device. Refer to the table below.

| | |
|---|---|
| HTTP | Application |
| TCP | Transport |
| IP | Internet |
| NAS | Network Layer |
| AS | Link Layer |
| Channels | Physical |

The initial NAS message is the first Layer 3 (L3) signaling message sent to the network during the radio resource (RR) connection establishment. This message is relayed by the access network to the core network. See e.g. 3GPP TS 48.008. More particularly, the message is communicated over the radio interface within an initial Layer 2 (L2) Set Asynchronous Balanced Mode (SABM) frame as part of a contention resolution procedure. See e.g. 3GPP TS 44.006. Similarly, such a message is communicated when the establishment takes place in a Universal Terrestrial Radio Access Network (UTRAN). In this case, the initial NAS message is communicated to the access network within an INITIAL DIRECT TRANSFER L3 message during an initial direct transfer procedure. See e.g. 3GPP TS 25.331.

The initial NAS messages are limited in size due to restrictions in the data link layer protocol in the GERAN. In this environment, the initial NAS messages are limited to twenty (20) octets. The reason for this limitation is that the SABM L2 frames that are communicated over the radio interface in order to establish the acknowledged mode (i.e. multiple frame acknowledged mode of operation) have their information field limited to 20 octets, do not provide for the transport of higher layer messages exceeding this maximum size of 20 octets (e.g., segmenting and transporting the initial NAS messages in separate units are not supported in existing specifications). See e.g. 3GPP TS 44.006. The complete initial NAS message has therefore to be encapsulated in a single SABM L2 frame. Note that the size limitation has already been reached for some of the initial NAS messages. For example, the Location Updating Request message has already reached its maximum size limit.

FIGS. 3-7 are process flow diagrams for describing various methods and apparatus for use in communicating supplemental network access stratum (NAS) information. Such methods may overcome the above-described deficiencies of the prior art (or related or similar deficiencies) in the above-described environment (i.e. GSM-based or GERAN) for circuit-switched communications, or related or similar environments. The methods may be executed by and between mobile device 102 and a network node 302 (such as an MSC) of the core network. The methods may be further embodied in a computer program product which includes a computer readable medium (e.g. memory or disk, etc. in the mobile device or network node) and computer instructions stored in the computer readable medium which are executable by one or more processors of the mobile device or network node.

Figure 3:
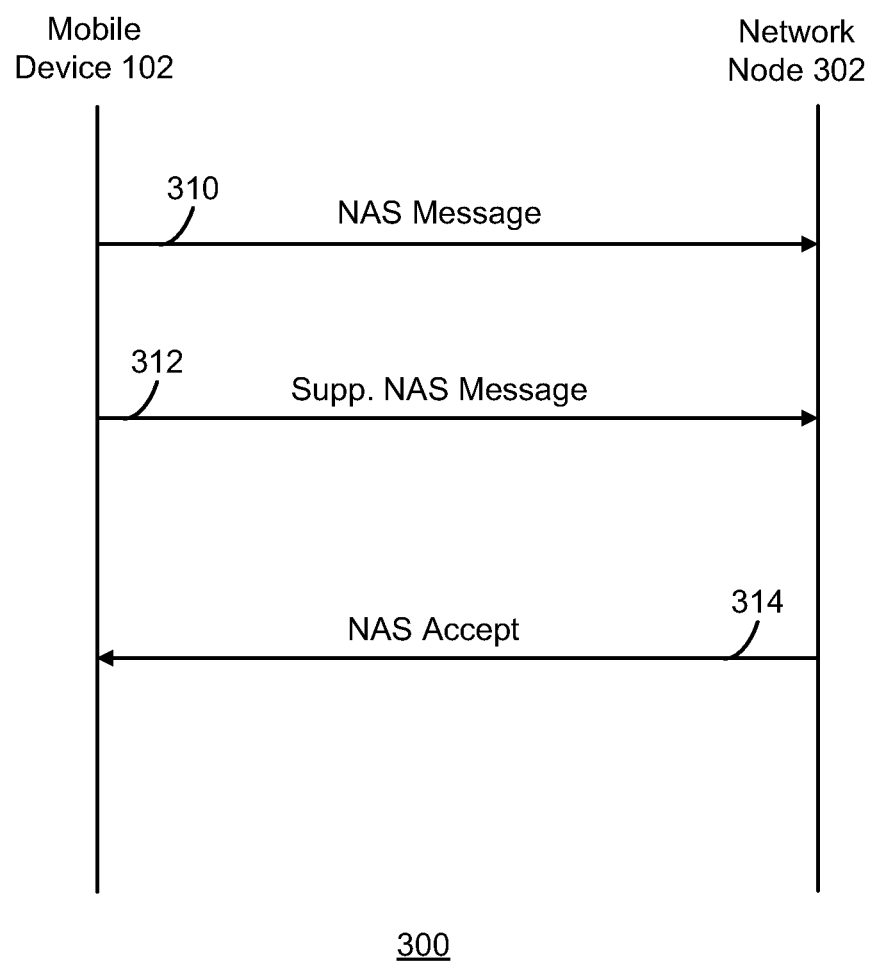
FIG. 3-7 are process flow diagrams for describing various methods and apparatus for use in communicating supplemental network access stratum (NAS) information in a wireless communication network.

Referring to the process flow diagram 300 of FIG. 3, mobile device 102 operates to send to network node 302 a NAS message associated with a NAS procedure (step 310 of FIG. 3). This NAS message is the first or initial NAS message that is transmitted from mobile device 102 for the NAS procedure. The initial NAS message includes NAS information, which may be that information defined in existing standards. The initial NAS message may be a Location Updating Request message, a CM Re-Establishment Request message, a CM Service Request message, a Paging Response message, an IMSI Detach Indication message, a Notification Response message, or an Immediate Setup message, as examples.

Prior to transmission, mobile device 102 encapsulates the initial NAS message in a Layer 2 (L2) frame. This L2 frame may be a Set Asynchronous Balanced Mode (SABM) L2 frame, for example. A SABM L2 frame is used to perform contention resolution and establish an acknowledged mode operation for SAPI 0 (see e.g. 3GPP TS 44.006) (a multiple frame mode of communication). The initial NAS message is limited in size according to the size limitation of the single SABM L2 frame information field (e.g. 20 octets). The serving base station subsystem (BSS) operates to receive the SABM L2 frame from mobile device 102, decapsulate the initial NAS message from the SABM L2 frame, and forward the initial NAS message to network node 302. Network node 302 receives the initial NAS message.

Next, mobile device 102 operates to send to network node 302 a supplemental NAS message associated with the NAS procedure (step 312 of FIG. 3). This supplemental NAS message is the second or subsequent NAS message that is transmitted from mobile device 102 for the same NAS procedure. The supplemental NAS information includes information that supplements the NAS information contained in the initial NAS message. Supplemental NAS information may general refer to NAS information that could not be contained in the initial NAS message and is instead communicated in a subsequent NAS message, e.g. a supplemental NAS message, or any NAS message configured to contain the supplemental NAS information. The supplemental NAS message may be said to be paired with or for pairing with the initial NAS message.

The message which includes this supplemental NAS information may be any suitable message; it may be a newly-defined message which makes use of a newly-defined message type (e.g. "Supplemental NAS Information" message type, or "Location Updating Request 2," etc., message type defined in the relevant message type table, e.g. in subclause 10.4 in TS 24.008).

In one embodiment, step 312 is performed if (e.g. only if) supplemental NAS messaging is supported by the mobile device. In another embodiment, step 312 is performed if (e.g. only if) supplemental NAS messaging supported by the mobile device and is indicated to be allowed or supported by the network (e.g. as described later in relation to FIG. 8).

Prior to transmission, mobile device 102 encapsulates the supplemental NAS message in a L2 frame. This L2 frame may be a L2 Information (I) frame, for example. The serving BSS operates to receive the L2 frame from mobile device 102, decapsulate the supplemental NAS message from the L2 frame, and forward the supplemental NAS message to network node 302. Network node 302 receives the supplemental NAS message.

In response, network node 302 operates to send to mobile device 102 a NAS accept message (step 314 of FIG. 3). In one embodiment, the network (e.g. network node 302 and/or other network node in the core network) operates to complete the NAS procedure in response to the supplemental NAS message, with use of or based on the NAS information contained in the initial NAS message and the supplemental NAS information in the supplemental NAS message. The NAS accept message is transmitted after and in response to the supplemental NAS message upon the completion of the NAS procedure on the network side. In another embodiment, the NAS accept message may be transmitted before or after the completion of the NAS procedure on the network side. Thus, after receipt of the NAS message in step 310, the network may operate to delay in time until it receives the supplemental NAS message in step 312 before completing the NAS procedure and sending the NAS accept message in step 314.

Note that the technique of FIG. 3 may be especially advantageous if the core network is required to have received some or all of the supplemental NAS information before making a decision to accept the request. Further, as the technique only triggers a single accept message for the entire procedure, (i.e. not one accept message per NAS message), power consumption and system interference is reduced. Even further, call setup times may be reduced as well. For example, in the scenario where the mobile device performs the Locating Updating procedure before initiating a call (e.g. CS fallback with Idle mode Signaling Reduction functionality (ISR) not activated, or CS fallback with ISR activated with change of Location Area Identity), each additional message block on the GERAN radio interface may further delay the call setup (e.g. up to 235 ms).

Although the size limitation of 20 octets is known to be applicable to GERAN (A/Gb mode), the technique may be utilized in other suitable environments, such as UMTS/UTRAN (Iu mode). This would avoid diverging between Iu mode and A/Gb mode the procedures and the message definitions which are currently identical or similar and defined in a single specification, TS 24.008). Otherwise, the addition of the new information elements (IEs) containing the supplemental NAS information would be required in both the existing (legacy) initial NAS messages (for Iu mode use only, if supplemental NAS messages were not to be used), and in the new supplemental NAS messages (for A/Gb mode use only as proposed by the present invention).

In the technique of FIG. 3, the supplemental NAS message may be scheduled for communication in one of a number of different ways. Consider, for example, an initial NAS message which is a Location Updating Request Message. In conventional implementations, the communication of the Location Updating Request message is immediately followed by the communication of the Access Stratum (AS) Classmark Change message (and UTRAN Classmark Change message, and/or CDMA2000 Classmark Change message, if they are sent), resulting from the triggering of the relevant procedures. In the techniques of the present disclosure, the supplemental NAS message may be communicated immediately after the Location Updating Request message as opposed to being communicated after the communication of the AS messages.

In one embodiment, the scheduling of the messages for communication will result from the following ordered sequence of messages and procedures, where the supplemental NAS message is communicated immediately after the Location Updating Request message:

1) SABM (Location Updating Request uplink message)
2) Supplemental NAS uplink message
3) [AS Classmark Change uplink message]
4) [AS UTRAN Classmark Change and/or AS CDMA2000 Classmark Change uplink message(s)]
5) [Authentication procedure]
6) [Ciphering procedure]
7) NAS Accept downlink message Note that [<Procedure name> procedure] or [<Message name> message] notation in the above sequence means that the triggering of Procedure, and the sending of the relevant messages, is optional. Further note that the sending of the NAS Accept message may be conditioned by further network messages exchanges and procedures. The communication of an extra supplemental NAS message may increase the overall duration of the procedure. In addition, the supplemental NAS information may be or include information that may condition the NAS procedure outcome (e.g. it may be useless to perform authentication and to start ciphering if the procedure will fail). In this embodiment, the supplemental NAS information would advantageously be delivered to the core network at the earliest opportunity, which would mitigate the listed effects.

In yet another embodiment, the scheduling of the messages for communication will result from the following ordered sequence of messages and procedures, where the supplemental NAS message is communicated after the transmission of the relevant AS classmark information.

1) SABM (Location Updating Request uplink message)
2) [AS Classmark Change uplink message]
3) [AS UTRAN Classmark Change and/or AS CDMA2000 Classmark Change uplink message]
4) Supplemental NAS uplink message
5) [Authentication procedure]
6) [Ciphering procedure]
7) NAS Accept downlink message In this embodiment, information relevant the access stratum (such as Classmark Change, UTRAN Classmark Change or CDMA2000 Classmark Change message) would be delivered to the access network at the earliest opportunity. This information may have more urgency to the access network (e.g. when sent as per an early classmark sending procedure) than the NAS information to the core network, and would be delayed of a minimum of e.g. 235 ms (transmission opportunities recurrence in case a Standalone Dedicated Control Channel (SDCCH) is used) if the supplemental NAS message was sent before.

In yet even another embodiment, the scheduling of the messages for communication will result from the following ordered sequence of messages and procedures, where the supplemental NAS message is communicated after the completion of the Authentication and Ciphering procedures:

1) SABM (Location Updating Request uplink message)
2) [AS Classmark Change uplink message]
3) [AS UTRAN Classmark Change and/or AS CDMA2000 Classmark Change uplink message]
4) [Authentication procedure]
5) [Ciphering procedure]
6) Supplemental NAS uplink message
7) NAS Accept downlink message The supplemental NAS information may be subject to security requirements.

Thus, in this embodiment, the supplemental NAS message is advantageously ciphered. Also, the AS related information (which is sent when early classmark sending is required) may have more urgency to the BSS than the NAS information to the MSC, and would be delayed of a minimum of e.g. 235 ms (transmission opportunities recurrence in case a SDCCH is used) if the supplemental NAS message was sent before.

Figure 4:
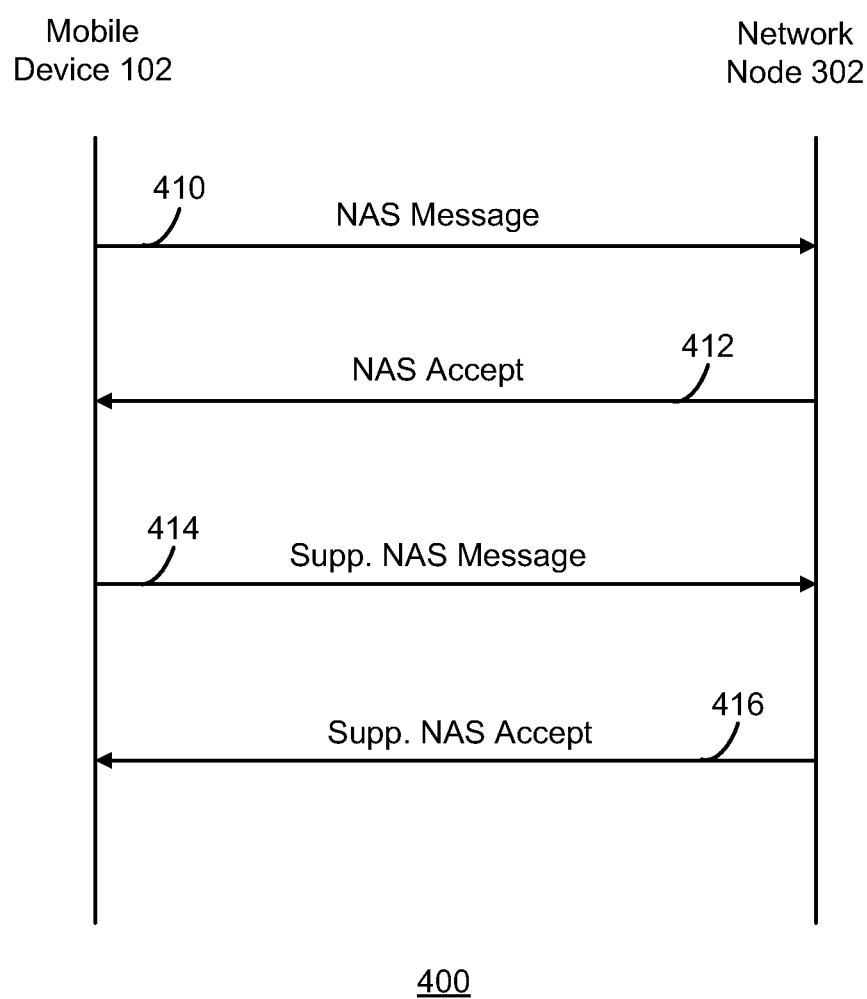

FIG. 4 is a process flow diagram 400 for describing an alternative method for use in communicating supplemental NAS information. In FIG. 4, mobile device 102 operates to send to network node 302 a NAS message associated with a NAS procedure (step 410 of FIG. 4). This NAS message is the first or initial NAS message that is transmitted from mobile device 102 for the NAS procedure. The initial NAS message includes NAS information, which may be that NAS information currently defined in existing standards. The initial NAS message may be a Location Updating Request message, a CM Re-Establishment Request message, a CM Service Request message, a Paging Response message, an IMSI Detach Indication message, a Notification Response message, or an Immediate Setup message, as examples.

Prior to transmission, mobile device 102 encapsulates the initial NAS message in a L2 frame. This L2 frame may be a SABM L2 frame, for example. A SABM L2 frame is used to perform contention resolution and establish the acknowledged mode operation. The initial NAS message is limited in size according to the size limitation of the single SABM L2 frame information field (e.g. 20 octets). The serving BSS operates to receive the SABM L2 frame from mobile device 102, decapsulate the initial NAS message from the SABM L2 frame, and forward the initial NAS message to network node 302. Network node 302 receives the initial NAS message. In response, network node 302 operates to send to mobile device 102 a NAS accept message (step 412 of FIG. 4). In this embodiment, the NAS accept message is communicated after and in response to the initial NAS message.

Next, mobile device 102 operates to send to network node 302 a supplemental NAS message associated with the NAS procedure (step 414 of FIG. 4). This supplemental NAS message is the second or subsequent NAS message that is transmitted from mobile device 102 for the same NAS procedure. The supplemental NAS information includes information that supplements the NAS information contained in the initial NAS message. Supplemental NAS information may general refer to NAS information that could not be contained in the initial NAS message and is instead communicated in a subsequent NAS message, e.g. a supplemental NAS message, or any NAS message configured to contain the supplemental NAS information. The supplemental NAS message may be said to be paired with or for pairing with the initial NAS message. The message which includes this supplemental NAS information may be any suitable message; it may be a newly-defined message which makes use of a newly-defined message type (e.g. "Supplemental NAS Information" type).

In one embodiment, step 414 is performed if (e.g. only if) supplemental NAS messaging is supported by the mobile device. In another embodiment, step 414 is performed if (e.g. only if) supplemental NAS messaging supported by the mobile device and is indicated to be allowed or supported by the network (e.g. as described later in relation to FIG. 8).

Prior to transmission, mobile device 102 encapsulates the supplemental NAS message in a L2 frame. This L2 frame may be a L2 Information (I) frame, for example. The serving BSS operates to receive the L2 frame from mobile device 102, decapsulate the supplemental NAS message from the L2 frame, and forward the supplemental NAS message to network node 302. Network node 302 receives the supplemental NAS message.

In response, network node 302 operates to send to mobile device 102 a supplemental NAS accept message (step 416 of FIG. 4). In one embodiment, the network (e.g. network node 302 and/or other network node in the core network) operates to complete the NAS procedure in response to the supplemental NAS message, with use of or based on the NAS information contained in the initial NAS message and the supplemental NAS information in the supplemental NAS message. The supplemental NAS accept message may be transmitted after and in response to the supplemental NAS message upon the completion of the NAS procedure on the network side. Alternatively, the supplemental NAS accept message may be transmitted before or after the completion of the NAS procedure on the network side.

Note that the technique of FIG. 4 may be especially advantageous if acknowledgment of the initial NAS message from the network is time sensitive or critical.

Figure 5:
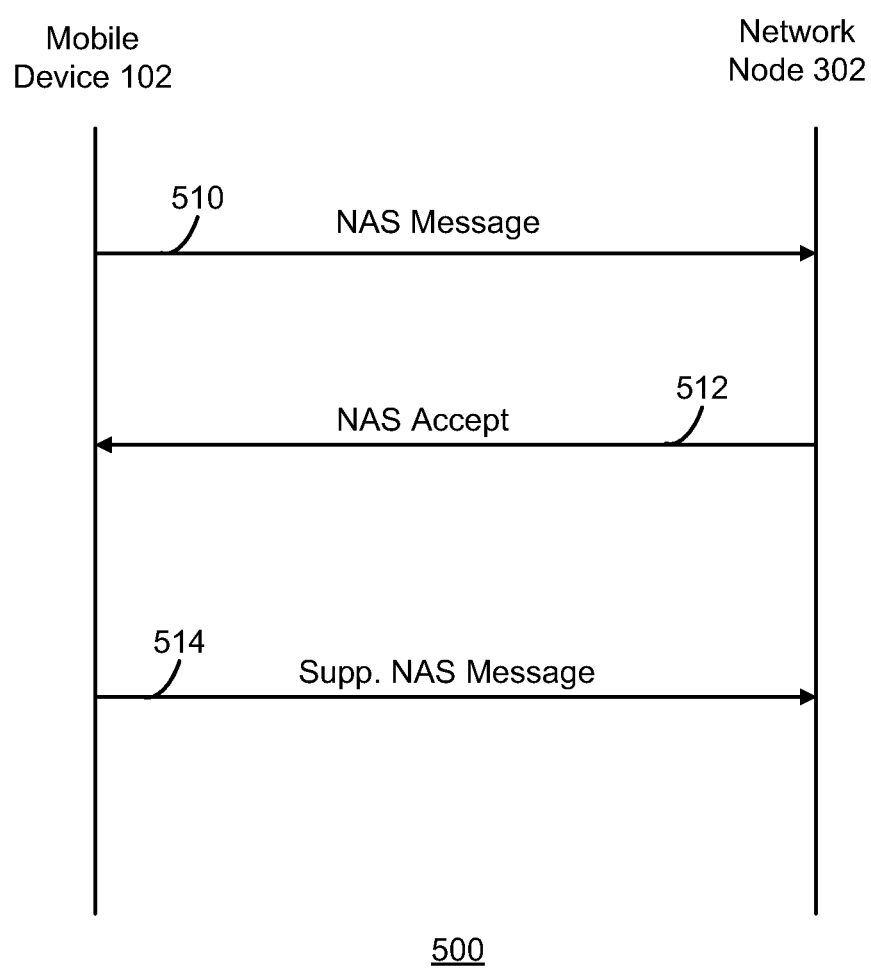

FIG. 5 is a process flow diagram 500 for describing yet another alternative method for use in communicating supplemental NAS information. In FIG. 5, mobile device 102 operates to send to network node 302 a NAS message associated with a NAS procedure (step 510 of FIG. 5). This NAS message is the first or initial NAS message that is transmitted from mobile device 102 for the NAS procedure. The initial NAS message includes NAS information, which may be that information defined in existing standards. The initial NAS message may be a Location Updating Request message, a CM Re-Establishment Request message, a CM Service Request message, a Paging Response message, an IMSI Detach Indication message, a Notification Response message, or an Immediate Setup message, as examples.

Prior to transmission, mobile device 102 encapsulates the initial NAS message in a L2 frame. This L2 frame may be a SABM L2 frame, for example. A SABM L2 frame is used to perform contention resolution and establish the acknowledged mode operation. The initial NAS message is limited in size according to the size limitation of the single SABM L2 frame information field (e.g. 20 octets). The serving BSS operates to receive the SABM L2 frame from mobile device 102, decapsulate the initial NAS message from the SABM L2 frame, and forward the initial NAS message to network node 302. Network node 302 receives the initial NAS message. In response, network node 302 operates to send to mobile device 102 a NAS accept message (step 512 of FIG. 5). In this embodiment, the NAS accept message is communicated after and in response to the initial NAS message.

Next, mobile device 102 operates to send to network node 302 a supplemental NAS message associated with the NAS procedure (step 514 of FIG. 5). This supplemental NAS message is the second or subsequent NAS message that is transmitted from mobile device 102 for the same NAS procedure. The supplemental NAS information includes information that supplements the NAS information contained in the initial NAS message. Supplemental NAS information may general refer to NAS information that could not be contained in the initial NAS message and is instead communicated in a subsequent NAS message, e.g. a supplemental NAS message, or any NAS message configured to contain the supplemental NAS information. The supplemental NAS message may be said to be paired with or for pairing with the initial NAS message. The message which includes this supplemental NAS information may be any suitable message; it may be a newly-defined message which makes use of a newly-defined message type (e.g. "Supplemental NAS Information" type).

In one embodiment, step 514 is performed if (e.g. only if) supplemental NAS messaging is supported by the mobile device. In another embodiment, step 514 is performed if (e.g. only if) supplemental NAS messaging supported by the mobile device and is indicated to be allowed or supported by the network (e.g. as described later in relation to FIG. 8).

Prior to transmission, mobile device 102 encapsulates the supplemental NAS message in a L2 frame. This L2 frame may be a L2 Information (I) frame, for example. The serving BSS operates to receive the L2 frame from mobile device 102, decapsulate the supplemental NAS message from the L2 frame, and forward the supplemental NAS message to network node 302. Network node 302 receives the supplemental NAS message.

In one embodiment, the network (e.g. network node 302 and/or other network node in the core network) operates to initiate the NAS procedure upon receipt of the initial NAS message in step 510. The NAS procedure is completed with use of or based on the NAS information contained in the initial NAS message. Note, however, the NAS procedure need not make use of the supplemental NAS information, and completion of the NAS procedure is not contingent upon the receipt of the supplemental NAS information. On the other hand, the network may utilize the supplemental NAS information for updating the NAS procedure and/or for associated mobile device operation. The NAS accept message may be transmitted after and in response to the initial NAS message upon the completion of the NAS procedure on the network side. Alternatively, the NAS accept message may be transmitted before or after the completion of the NAS procedure on the network side.

Note that the technique of FIG. 5 which utilizes a single NAS accept message in response to the initial NAS message, is especially advantageous in scenarios where the completion of the NAS procedure is not conditioned upon the receipt of the supplemental NAS message. In this technique, the supplemental NAS information may be said to be non-essential to the procedure or associated outcome.

Figure 6:
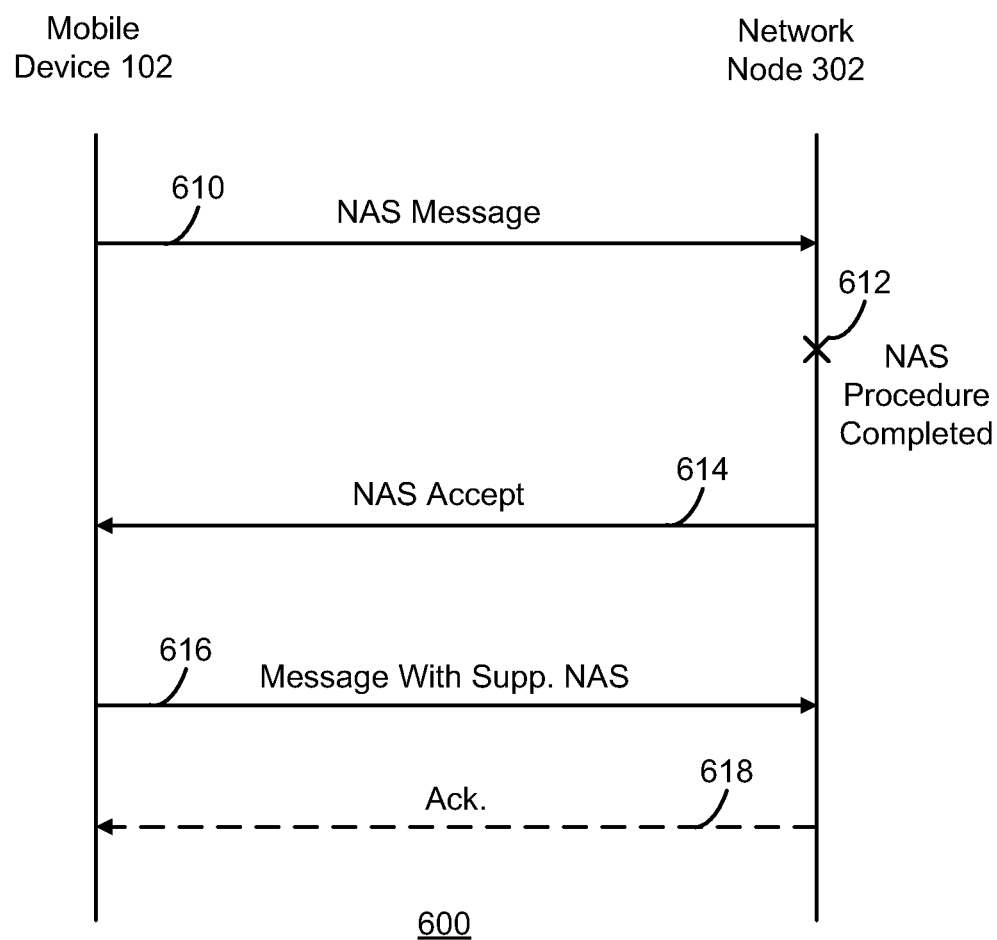

FIG. 6 is a process flow diagram 600 for describing still even another alternative method for use in communicating supplemental NAS information. In FIG. 6, mobile device 102 operates to send to network node 302 a NAS message associated with a NAS procedure (step 610 of FIG. 6). This NAS message is the first or initial NAS message that is transmitted from mobile device 102 for the NAS procedure. The initial NAS message includes NAS information, which may be that information defined in existing standards. The initial NAS message may be a Location Updating Request message, a CM Re-Establishment Request message, a CM Service Request message, a Paging Response message, an IMSI Detach Indication message, a Notification Response message, or an Immediate Setup message, as examples.

Prior to transmission, mobile device 102 encapsulates the initial NAS message in a L2 frame. This L2 frame may be a SABM L2 frame, for example. A SABM L2 frame is used to perform contention resolution and establish the acknowledged mode operation. The initial NAS message is limited in size according to the size limitation of the single SABM L2 frame information field (e.g. 20 octets). The serving BSS operates to receive the SABM L2 frame from mobile device 102, decapsulate the initial NAS message from the SABM L2 frame, and forward the initial NAS message to network node 302. Network node 302 receives the initial NAS message.

After the receipt of the initial NAS message in step 610, the network (e.g. network node 302 and/or other network node in the core network) initiates the NAS procedure. The NAS procedure is performed and completed with use of or based on the NAS information contained in the initial NAS message of step 610 (step 612 of FIG. 6). Note that completion of the NAS procedure is not contingent upon and need not make use of any supplemental NAS information.

Network node 302 then operates to send to mobile device 102 a NAS accept message (step 614 of FIG. 6). In this embodiment, the NAS accept message is communicated after and in response to the initial NAS message. In turn, mobile device 102 receives the NAS accept message.

Next, mobile device 102 operates to send to network node 302 a message which includes supplemental NAS information (step 616 of FIG. 6). The supplemental NAS information includes information that supplements the NAS information contained in the initial NAS message of step 610. However, in contrast to the example illustrated in FIG. 5, the supplemental NAS information is not paired with the initial NAS message of step 610, as the completion of the NAS procedure 614 is not contingent upon the supplemental NAS information. Supplemental NAS information may general refer to NAS information that could not be contained in the initial NAS message and is instead communicated in a subsequent NAS message, e.g. any NAS message configured to contain the supplemental NAS information.

The message which includes the supplemental NAS information may be any suitable message. This may be a newly-defined message which makes use of a newly-defined message type. For example, the message may be a mobility management (MM) message. More particularly, for example, the message may be referred to as an MM Uplink Information message. Alternatively, the message may include information useful for protocol(s) other than MM.

In one embodiment, step 616 is performed if (e.g. only if) supplemental NAS messaging is supported by the mobile device. In another embodiment, step 616 is performed if (e.g. only if) supplemental NAS messaging supported by the mobile device and is indicated to be allowed or supported by the network (e.g. as described later in relation to FIG. 8). Alternatively, step 616 may be performed irrespective of existing support for supplemental NAS messaging, if e.g. the message includes the supplemental NAS information specified so as to be backward compatible with a legacy network.

In turn, network node 302 receives the message which includes the supplemental NAS information. In response, network node 302 may optionally operate to send to mobile device 102 an acknowledgement message (step 618 of FIG. 6). In this embodiment, the acknowledgement message is communicated after and in response to the message of step 616, as an acknowledgement to the message. This acknowledgement message may be a L3 message on the downlink. The network may utilize the supplemental NAS information for updating the NAS procedure and/or for associated mobile device operation.

Note that the technique of FIG. 6 is especially suitable in scenarios where the completion of the NAS procedure is not conditioned upon the receipt of the message which includes the supplemental NAS information. In this technique, the supplemental NAS information may be said to be non-essential to the procedure or associated outcome. As the message of step 616 is decorrelated from the NAS procedure, the NAS procedure would not fail if the message was not received or if reception of the message failed. The related uplink message (e.g. MM Uplink information message) may be sent regardless of the initial NAS procedure, and may even be sent if the initial NAS procedure is not triggered.

Figure 7:
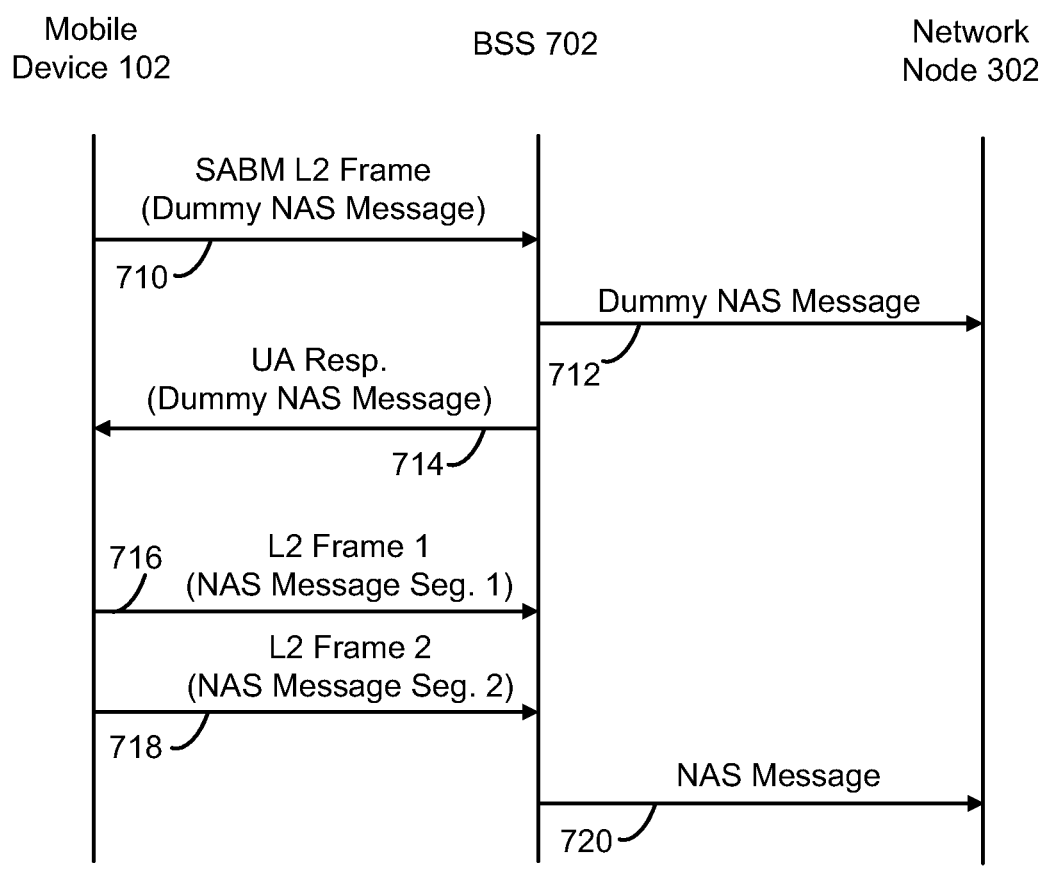

FIG. 7 is a process flow diagram 700 for describing another alternative method for use in communicating supplemental NAS information. Mobile device 102 operates to send to a serving BSS 702 a NAS message (step 710 of FIG. 7). This NAS message is the first or initial NAS message that is transmitted from mobile device 102. This initial NAS message may be or be referred to as a "dummy" NAS message, which may include little or no meaningful NAS information for performing or completing the NAS procedure. Prior to transmission, mobile device 102 encapsulates the initial NAS message in a L2 frame. This L2 frame may be a SABM L2 frame, for example. A SABM L2 frame is used to perform contention resolution and establish the multiple frame mode of operation. The initial NAS message is limited in size according to the size limitation of the single SABM L2 frame information field (e.g. 20 octets).

The serving BSS 702 receives the SABM L2 frame from mobile device 102, and a connection is established between the serving BSS 702 and network node 302. The serving BSS 702 decapsulates the initial NAS message from the SABM L2 frame, and sends the initial NAS message to network node 302 (step 712 of FIG. 7).

Network node 302 receives and decodes the initial NAS message, but is configured to ignore and/or discard it. Network node 302 waits to receive a subsequent NAS message.

In response to receiving the SABM L2 frame, serving BSS 702 also sends a response to mobile device 102 (step 714 of FIG. 7). This response may be, for example, an Unnumbered Acknowledgement (UA) response message. The UA response message includes or "mirrors back" the initial NAS message in its information field. Mobile device 102 receives the UA response message which includes the initial NAS message. Mobile device 102 operates to compare the originally transmitted L2 frame information field from step 710 with the received L2 frame information field from step 714, in order to resolve contention.

Next, mobile device 102 operates to send to network node 302 a subsequent NAS message which includes NAS information (step 716 and 718 of FIG. 7). The subsequent NAS message which includes the NAS information may be any suitable message. In this technique, mobile device 102 encapsulates the subsequent NAS message in one or more L2 frames for transmission. For example, the subsequent NAS message may be encapsulated in two (2) L2 frames as illustrated. The L2 frames may be L2 information (I) frames, for example.

Mobile device 102 is communicating in accordance with the multiple frame mode of operation, and therefore this subsequent NAS message which includes the NAS information is not limited in size according to the size limitation of a single SABM L2 frame information field. The size of the subsequent NAS message of steps 716 and 718 may be greater than the size limitation imposed by a single SABM L2 frame information field (i.e. the message of steps 716 and 718 may have a size that is greater than 20 octets). Again, this is made possible, for example, since the subsequent NAS message may be segmented by mobile device 102 in two or more segments transmitted using two or more L2 information (I) frames. Therefore, newly defined supplemental NAS information may be included in the subsequent NAS message.

The serving BSS 702 receives the L2 frame(s) from mobile device 102, decapsulates the subsequent NAS message from the L2 frame(s), and sends the subsequent NAS message to network node 302 (step 720 of FIG. 7). The network (e.g. network node 302 and/or other network node in the core network) then operates to perform the NAS procedure. The NAS procedure is performed with use of or based on the NAS information contained in the subsequent NAS message. Thus, after receipt of the initial dummy NAS message in step 712, the network may operate to delay in time until it receives the (actual) subsequent NAS message in step 718 before performing and/or completing the NAS procedure.

In one embodiment, the technique of FIG. 7 is performed if (e.g. only if) supplemental NAS messaging is supported by the mobile device. In another embodiment, the technique of FIG. 7 is performed if (e.g. only if) supplemental NAS messaging supported by the mobile device and is indicated to be allowed or supported by the network (e.g. as described later in relation to FIG. 8). If not allowed or supported, processing will occur in accordance with conventional NAS information processing.

As mentioned above, the dummy NAS message may include little or no meaningful NAS information for performing the NAS procedure. For example, the dummy NAS message may include a single 'dummy' octet. On the other hand, this message is also used by the AS layer for contention resolution and, in order to be able to perform this task, the NAS information should be or include a bit string that is unique to mobile device 102. For example, the NAS information may be or may include an identification of mobile device 102 (e.g. its mobile device Identity). Alternatively, other unique information may be utilized.

The technique of FIG. 7 is advantageous in that the specification of paired messages are not required, and therefore there may be no need to upgrade UMTS/UTRAN environments with modified procedures for the communication of supplemental NAS information. One constraint, however, relates to requirements of the BSS of the GERAN access network. For mobile device capabilities, the BSS may be required to extract the mobile station classmark information from the initial NAS Message (see e.g. 3GPP TS 48.008 §3.1.16). For MSCs pooling, the BSC may be required to derive from the Initial Layer 3 messages the NRI from the TMSI (see e.g. 3GPP TS 23.236). This may therefore impact the session establishment if the initial NAS message is not recognized as part of the ones explicitly listed in the specification.

Therefore, the technique of FIG. 7 may be complemented with one of the following alternatives. In one alternative, BSSs are upgraded to support the new initial dummy NAS message(s). The new message may be of any type, and should preferably contain mobile device identity and classmark information. For avoiding wide BSS upgrades in a PLMN, the network may send an indication of the support of the new initial NAS message(s). The mobile device will not attempt to use a new initial NAS message if the network has not indicated that it supports it. One embodiment may provide that the initial NAS message is not forwarded to the core network by the BSS, as the NAS information is not useful to it. However, such option might require additional changes to existing implementations, e.g., at the access network/core network interface.

As another alternative, a "backwards compatible" initial NAS message is defined and/or utilized. This alternative imposes that the initial NAS message be fully backward compatible for avoiding any BSS upgrade. More particularly, the message type may be recognized as an existing message type, the content may be consistent with the corresponding message type, and the BSS behavior may not be affected. One option is to simply reuse the initial NAS message, two instances of which would therefore be communicated. The first instance of the message would include at least the (existing) mandatory NAS information elements, with the condition that the first message size instance would not exceed the maximum limit (i.e. 20 octets). The second instance of the message would be the "complete" message including new information/extensions and whose size may exceed the limit of 20 octets. An indication may be defined and included in the first NAS message instance, which indicates to the upgraded core network that it has to take into account the second NAS message instance and ignore the content of the first NAS instance. Note, however, this indication may be ignored by a non-upgraded core network, which would receive the two NAS instances, and would then treat the second one which includes all required information.

With reference back to all or some of the techniques described above in relation to FIGS. 3-7, it may be advantageous for the mobile device to signal to the network that the mobile device intends to send a supplemental NAS message, or otherwise indicate supplemental NAS messaging operation. Consider a legacy network node that does not recognize a supplemental NAS message, which would respond immediately to the initial NAS message and not wait for any supplemental NAS message. It would be desirable to achieve backwards compatibility to legacy networks. In some or all of the techniques described above, the mobile device may set an indication in the initial NAS message which indicates whether a supplemental NAS message will follow, prior to its transmission.

For example, for the case of the Location Updating Request message, it is advantageous that the network is aware that the mobile device intends to send the supplemental NAS message. This information is required on the network side, to inform the network node (e.g. MSC) that it should expect, and possibly needs to wait for, a supplemental NAS message, while or before communicating with other network nodes (e.g. other MSC, or VLR, etc.). The indication would indicate the network node to wait for supplemental NAS information before it determines the next step (such as to complete the procedure, to accept or reject the request). If the supplemental NAS information is not necessary for the network to complete the NAS procedure (or none of any supplemental NAS information is necessary for the network to decide), then this indication may be omitted, but otherwise this indication should be required.

Another reason to introduce or utilize such indication is to avoid further signaling in the network, especially where both NAS messages contain items of information that need to be communicated to another network node. In this case, it is beneficial to transmit the entire NAS information (the initial NAS information part plus the supplemental NAS information part) after having received the supplemental NAS message from the mobile device, rather than performing two distinct transmissions. In addition, this may lead to less implementation changes on the network side than having to trigger an additional internal network procedure/message). Another reason would be to avoid the triggering of an error message for non-upgraded networks that receive such unknown message.

Figure 8:
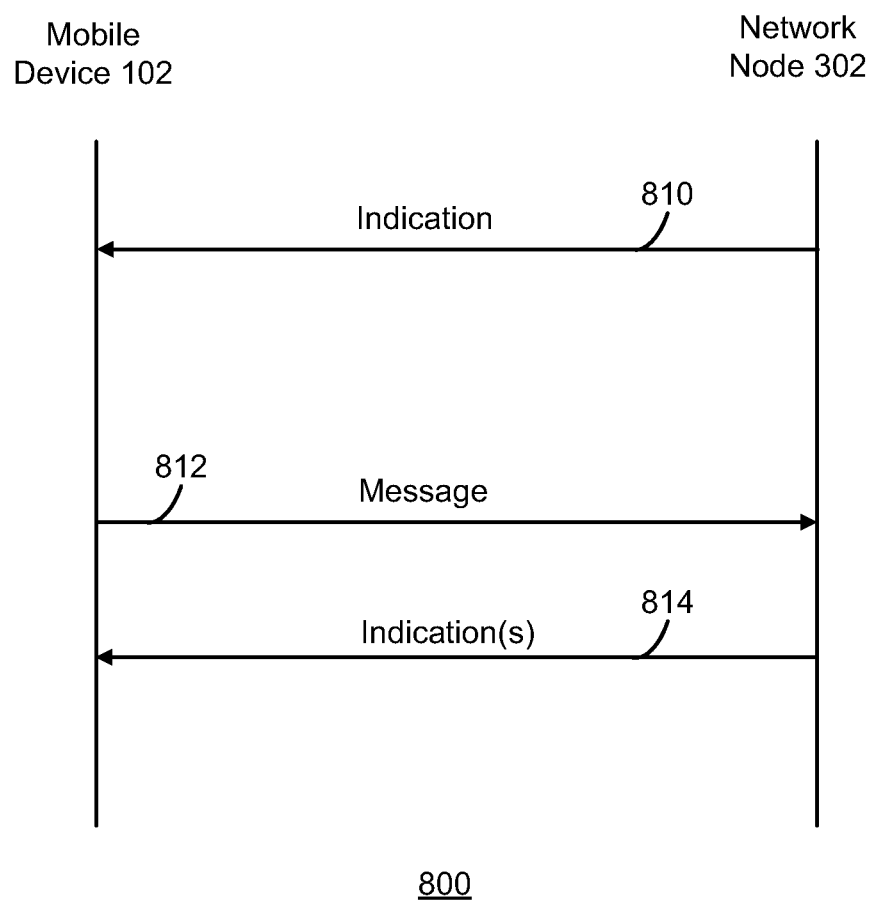
FIG. 8 is a process flow diagram for describing methods and apparatus for use in indicating whether supplemental NAS messaging is allowed or supported by the network, which may be utilized in relation to the techniques described in relation to FIGS. 3-7.

In effort to achieve sufficient backwards compatibility, FIG. 8 is a process flow diagram for describing methods and apparatus for use in indicating whether supplemental NAS messaging is allowed or supported by the network. Such techniques may be used together with and/or in relation to the techniques described in relation to FIGS. 3-7.

In FIG. 8, the network operates to send an indication to mobile device 102 (step 810 of FIG. 8). This indication may be, for example, broadcasted over a channel (e.g. a control channel, such as a broadcast control channel or BCCH), or otherwise transmitted to the mobile device 102. In turn, mobile device 102 receives the indication. The indication indicates whether network support exists for supplemental NAS messaging. Further, or alternatively, the indication may indicate whether the network allows mobile device 102 to send the supplemental NAS messaging.

The indication may indicate whether network support exists for (or the mobile device is allowed to send) supplemental NAS messaging for all or some (e.g. a plurality of) different supplemental NAS message types. On the other hand, the indication may indicate whether network support exists for (or the mobile device is allowed to send) supplemental NAS messaging for a particular, single NAS message type.

In addition to or as an alternative to step 810, mobile device 102 sends a message to the network (step 812 of FIG. 8). The network receives the message and responds by sending to the mobile device 102 an indication which indicates whether supplemental NAS messaging is allowed or supported by the network. Again, the indication may indicate whether supplemental NAS messaging is allowed or supported by the network for all or some (e.g. a plurality of) different supplemental NAS message types. On the other hand, the indication may indicate whether supplemental NAS messaging is allowed or supported by the network for a particular, single NAS message type.

Even further regarding backwards compatibility, note that error handling in TS 24.008 Subclause 8.4 specifies that the network should send an error message (called a "Status message") to the mobile device in an acknowledged mode of operation if the network receives a message with an unknown message type:

If the network receives an MM message with message type not defined for the PD or not implemented by the receiver in a protocol state where reception of an unsolicited message with the given PD from the mobile station is not foreseen in the protocol, the network actions are implementation dependent. Otherwise, if the network receives a message with message type not defined for the PD or not implemented by the receiver, it shall ignore the message except that it should return a status message (STATUS, MM STATUS, GMM STATUS or SM STATUS depending on the protocol discriminator) with cause #97 "message type non-existent or not implemented.

With no indication implemented, an upgraded mobile device sends the supplemental NAS message. Thereafter, the mobile device would receive the Status message, sent in response to the supplemental NAS message.

Thus, in one technique as described above, the network provides an indication to the mobile device regarding whether it has implemented supplemental NAS messaging. A mobile device supporting this enhancement would not send the supplemental NAS message if this indication is not present (legacy network) or is present but not set (upgraded network not implementing the enhancement). This would prevent the reception of an unknown or of a not supported message in the network as well as the sending of a Status message in the downlink. In one alternative, a common indication would be applicable to the support by the network of all the supplemental NAS messages. In another alternative, a distinct indication would be specific to a given supplemental NAS message, or to a given functionality (that may encompass more than one supplemental NAS message).

Thus, one or more indications may be introduced in a selected message on the GERAN BCCH/BCCH extension (e.g. a System Information message) or CCCH (e.g. an Immediate Assignment message), where the indications indicate that supplemental NAS messaging or new message types are allowed or supported by the network for one or more supplemental NAS messages.

As one option, there may be a single network indication per message type or functionality. At the time that each new supplemental NAS message needs to be specified or created, one network indication could be added on the BCCH/BCCH Extended or CCCH. Thus, each supplemental NAS message may be introduced at different times, only when necessary, with a distinct indication specified for each new message. In the described environment, this means that seven indications (e.g. bits) would be needed for addressing individually each type of message. More particularly, the seven indications may correspond to a Location Updating Request message, a CM Re-Establishment Request message, a CM Service Request message, a Paging Response message, an IMSI Detach Indication message, a Notification Response message, or an Immediate Setup message.

In the case of Multiple Operator Core Network (MOCN) (Access Stratum network sharing), these indications may have to be replicated for the different core networks connected to the shared access network. Such a solution would have the drawback of unnecessarily consuming space on the GERAN BCCH/CCCH, which is a scarce resource, for encoding the individual indications.

The indication may either indicate the support of individual supplemental NAS messages, or indicate the support of a functionality that may encompass the support of several supplemental NAS messages. For example, given two different supplemental NAS messages including information related to a same functionality A, the indication by the network that it supports this functionality A would implicitly signify the support of the two related supplemental NAS messages that may be sent when required or relevant. This principle could actually extend to any number of messages and/or functionalities. Information related to more than one functionality may also be included in a same supplemental NAS message.

Alternatively, a single network indication signaling the support of a particular supplemental NAS message associated to a given procedure may be introduced, wherein the network sends support information related to other supplemental NAS messages in a downlink message associated to the same procedure (see e.g. steps 812 and 814 of FIG. 8). For example, a support indication may be introduced on BCCH or CCCH (optionally, for each core network in the case of access network sharing) for supplemental NAS messaging associated specifically with the Location area update procedure, and then separate support indications for other supplemental NAS message types associated to different procedures may be carried in the Location Update Accept message.

As another option, a single network indication may be introduced that would indicate the support by the network for all considered future uplink messages (or, optionally, a single network indication per core network, in the case of access network sharing). A particular embodiment would be to anticipate potential extensions for all the identified initial NAS uplink messages, and specify in advance the (possibly empty) structure of all of the supplemental NAS messages with their new corresponding message types. This would be done at the same time that the first supplemental NAS message (with its first content) is required and introduced in the standards. Thereafter, new information may be added in the future in any of the supplemental NAS messages that were previously introduced, and the mobile devices supporting such new information would send the relevant message(s) if (e.g. only if) allowed or supported by the network, i.e. only if the indication from the network that supplemental NAS messaging is allowed or supported is set correspondingly.

For example, consider the example of the Location Updating Request 2 supplemental NAS message type being introduced at version 10.4.0 of TS 24.008:
Version 10.4.0:
    Location Updating Request 2 message introduced (with some contents, for example, at least one information element)
    All other supplemental NAS messages introduced as "empty" messages (no content) with new message types defined (E.g. CM Re-establishment request 2, CM Service Request 2, . . . , Immediate Setup 2)

Network indication introduced, indicating the support for all new uplink supplemental NAS message types Version 10.6.0:
CM Service Request 2 enhanced with supplemental NAS information in the message In this example, for the case of a legacy network which does not send an indication which indicates that supplemental NAS messaging is supported or allowed by the network, a mobile device compliant with version 10.4.0 of the specification that supports supplemental NAS messaging for Location Updating Request messages (i.e. Location Updating Request 2 message type), or a mobile device compliant with version 10.6.0 of the specification that supports supplemental NAS messaging for the CM Service Request messages (i.e. CM Service Request 2 message type), would not send any of those messages to a legacy network (indication not broadcast). Therefore, the legacy network would not send a Status message back to the device.

If the network is compliant to version 10.4.0 onwards of the specification and has indicated that supplemental NAS messaging is allowed or supported, a mobile device compliant with version 10.4.0 of the specification that supports supplemental NAS messaging for Location Updating Request messages may send the supplemental NAS message paired with a Location Updating Request message. The same mobile device would never send the supplemental NAS message paired with the CM Service Request message. A mobile device compliant to version 10.6.0 of the specification may send the supplemental NAS message paired with the CM Service Request message (with supplemental NAS information). A network compliant to version 10.4.0 of the specification (or a network compliant to version 10.6.0 onwards but not enhanced to process the supplemental NAS information introduced in the CM Service Request 2 message) would recognize the message type, hence would not send any Status message back to the mobile device in response, but would ignore the related NAS information.

Thus, in one illustrative method in a network for limiting the occurrences in which Status messages have to be sent, the method may involve sending an indication indicating whether supplemental NAS messaging is allowed or supported by the network; receiving from the mobile device an initial NAS message associated with a NAS procedure, the initial NAS message including NAS information; receiving from the mobile device a supplemental NAS message which includes supplemental NAS information; identifying a predetermined message type of the supplemental NAS message; if the network supports the supplemental NAS message for the predetermined message type, then processing the supplemental NAS information; and if the network fails to support the supplemental NAS message for the predetermined message type, then ignoring the supplemental NAS information and refraining from sending a status message to the mobile device. A corresponding method in a mobile device which corresponds to this network method is employed as well.

Advantageously, such technique avoids having a Status messages being sent in the downlink. Also note that this alternative keeps the number of indications sent by the network to a minimum (one), and therefore avoids excessive overloading of e.g. the GERAN BCCH/BCCH extended or CCCH.

An implementation option of this method would be to define the complete set of new supplemental NAS message types in the relevant message type tables (for example the type tables in subclause 10.4 in 24.008), but to only specify the supplemental NAS message(s) structure and contents when actually required, for example, the Location Updating Request 2 message (e.g. when supplemental NAS information has to be added and would cause the maximum allowed size to be exceeded for the corresponding initial NAS message), and not the message structures (e.g. empty message structures not containing supplemental NAS information) for the other, not yet required, supplemental NAS messages in the identified set.

Existing message types may alternatively be reused in order to allow backwards compatibility. One other alternative to defining new message types for the paired supplemental NAS messages would be using an already existing message, for including the supplemental NAS information, such as a non upgraded network would not trigger an inappropriate procedure and/or send an MM status message in return. The MM status message itself could be such already existing message, as the network should not wrongly react to messages with added/unknown optional elements (this is a basic of backward compatibility principles for GSM protocols—see TS 24.008 section 8.6).

Reusing an existing message for a different purpose may cause confusion (for both new and legacy usages). It is therefore proposed to reuse the same message type value, but associate a new (different) name (e.g. "MM Additional Uplink Information"). The new message structure may be built on the existing structure of the MM status to ensure backward/forward compatibility. A non-upgraded core network may consider the message as a MM Status and ignore it, and possibly log a warning. An upgraded core network may use the new information as specified in the context of the initial access enhanced procedures.

Different structures/names may be specified (e.g. one for each initial procedure requiring message extensions—new Information Elements being optional or conditional). Alternatively, a single composite message structure including new information relevant to different procedures could be defined: the mobile device would populate and send the relevant IEs (optional, possibly conditional/exclusive), depending on which procedure is triggered, and specific error handling could also be specified in the context of each procedure).

One option may be to include in the message a new information element indicating a message sub-type whose value would be specific to the procedure or context of use, and e.g. conditioning the content of the message. As the "Reject cause" is a mandatory IE of the MM Status message, an appropriate cause code needs to be selected when the MM Status message is reused and sent as a supplemental NAS message paired to the initial NAS message.

Note that although this disclosure primarily relates to GSM cellular networks, the different solutions described herein could be re-used for other 3GPP Technologies (e.g. UMTS or LTE), or even for other systems (e.g. IEEE).

Thus, various methods and apparatus for use in communicating supplemental non access stratum (NAS) information have been described.

One method in a mobile communication device for use in communicating supplemental NAS information may comprise sending to a network an initial NAS message associated with a NAS procedure; and sending to the network a supplemental NAS message associated with the NAS procedure. The initial NAS message may comprise one of a Location Updating Request message, a CM Re-Establishment Request message, a CM Service Request message, a Paging Response message, an IMSI Detach Indication message, a Notification Response message, or an Immediate Setup message.

The method in the mobile device may also comprise receiving from the network a NAS accept message associated with the NAS procedure. The method may further comprise receiving from the network a NAS accept message in response to sending the initial NAS message and prior to sending the supplemental NAS message. The method may further comprise receiving from the network a NAS accept message after sending the supplemental NAS message. The method may further comprise receiving from the network a NAS accept message associated with the NAS procedure in response to sending the initial NAS message; and receiving from the network a supplemental NAS accept message associated with the NAS procedure in response to sending the supplemental NAS message.

The method in the mobile device may further comprise receiving from the network an indication indicating whether the supplemental NAS messaging is allowed or supported by the network. The method may further comprise, if the indication indicates that the supplemental NAS messaging is allowed or supported by the network, then sending to the network the supplemental NAS message for the NAS procedure, and otherwise refraining from sending to the network the supplemental NAS message. The method in the mobile device may further comprise setting an indication in the initial NAS message, the indication indicating whether the mobile device intends to send the supplemental NAS message. The method in the mobile device may further comprise encapsulating the initial NAS message in a first layer 2 frame for transmission; and encapsulating the supplemental NAS message in one or more second layer 2 frames for transmission. The first layer 2 frame may comprise a SABM frame, and the one or more second layer 2 frames may comprise Information frames.

The mobile device may comprise an RF transceiver; one or more processors coupled to the RF transceiver; and wherein the one or more processors are configured to perform the steps of the methods described above. The method may be performed in accordance with computer instructions stored in a computer readable medium and executable by one or more processors of the mobile device.

One corresponding method in a network for use in communicating supplemental NAS information comprises receiving from a mobile device an initial NAS message associated with a NAS procedure; and receiving from the mobile device a supplemental NAS message associated with the NAS procedure. The initial NAS message may comprise one of a Location Updating Request message, a CM Re-Establishment Request message, a CM Service Request message, a Paging Response message, an IMSI Detach Indication message, a Notification Response message, or an Immediate Setup message.

The method in the network may further comprise sending to the mobile device a NAS accept message associated with the NAS procedure. The method may further comprise sending to the mobile device a NAS accept message associated with the NAS procedure in response to receiving the initial NAS message and before receiving the supplemental NAS message. The method may further comprise sending to the mobile device a NAS accept message associated with the NAS procedure in response to and after receiving the supplemental NAS message. The method may further comprise sending to the mobile device a NAS accept message associated with the NAS procedure in response to receiving the initial NAS message; and sending to the mobile device a supplemental NAS accept message associated with the NAS procedure in response to receiving the supplemental NAS message.

The method in the network may further comprise sending an indication indicating whether supplemental NAS messaging is allowed or supported by the network. The method may further comprise identifying an indication in the initial NAS message, the indication indicating whether the mobile device intends to send the supplemental NAS message. The method may further comprise, if the indication indicates that the mobile device intends to send the supplemental NAS message, then receiving from the mobile device the supplemental NAS message for the NAS procedure. The method in the network may comprise decapsulating the initial NAS message from a first layer 2 frame; and decapsulating the supplemental NAS message from one or more second layer 2 frames. The first layer 2 frame may comprise a SABM frame, and the one or more second layer 2 frames may comprise Information frames.

The method in the network may further comprise completing the NAS procedure based on NAS information in the initial NAS message and supplemental NAS information in the supplemental NAS message. The method in the network may further comprise identifying an association between the supplemental NAS message and the initial NAS message and, in response to the identifying, pairing the initial and the supplemental NAS messages and performing the NAS procedure in response. The method in the network may be performed by a network node comprising one or more processors; a transceiver coupled to the one or more processors; wherein the one or more processors are configured to perform the actions of the methods described above. The network node may be or include a mobile switching center (MSC). The method may be performed in accordance with computer instructions stored in a computer readable medium and executable by one or more processors of the network node.

The methods may further be utilized in a wireless communications system configured for use in the communication of supplemental NAS information. The wireless communication system includes a radio access network; a core network coupled to the radio access network; and a mobile device configured to communicate with the wireless network. The mobile device is configured to perform the actions of the methods as described above. The network is also configured to perform the actions of the methods as described above.

Another method in a mobile device for use in communicating supplemental NAS information comprises sending to a network an initial NAS message associated with a NAS procedure, the initial NAS message including NAS information; and after the NAS procedure is completed, sending to the network a message which includes supplemental NAS information. The initial NAS message may comprise one of a Location Updating Request message, a CM Re-Establishment Request message, a CM Service Request message, a Paging Response message, an IMSI Detach Indication message, a Notification Response message, or an Immediate Setup message. The message which includes the supplemental NAS information may comprise a mobility management (MM) message, or relevant to a different protocol.

The method in the mobile device may further comprise receiving from the network an indication indicating whether supplemental NAS messaging is allowed or supported by the network. The method may further comprise, if the indication indicates that the supplemental NAS messaging is allowed or supported by the network, then sending to the network the message which includes the supplemental NAS information. The method in the mobile device may further comprise setting an indication in the initial NAS message, the indication indicating whether the mobile device intends to send the message which includes the supplemental NAS information. The method in the mobile device may further comprise encapsulating the initial NAS message in a first layer 2 frame for transmission; and encapsulating the supplemental NAS message in one or more second layer 2 frames for transmission. The first layer 2 frame may comprise a SABM frame.

The mobile device may comprise an RF transceiver; one or more processors coupled to the RF transceiver; and wherein the one or more processors are configured to perform the steps of the methods described above. The method may be performed in accordance with computer instructions stored in a computer readable medium and executable by one or more processors of the mobile device.

Another corresponding method in a network for use in communicating supplemental NAS information comprises receiving from a mobile device an initial NAS message associated with a NAS procedure, the initial NAS message including NAS information; and receiving from the mobile device a message which includes the supplemental NAS information. The initial NAS message may comprise one of a Location Updating Request message, a CM Re-Establishment Request message, a CM Service Request message, a Paging Response message, an IMSI Detach Indication message, a Notification Response message, or an Immediate Setup message. The message which includes the supplemental NAS information may comprise a mobility management (MM) message, or relevant to a different protocol.

The method in the network may further comprise sending to the mobile device an indication indicating whether supplemental NAS messaging is allowed or supported by the network. The method may comprise, when the indication indicates that the supplemental NAS messaging is allowed or supported by the network, then receiving from the mobile device the message which includes the supplemental NAS information. The method in the network may further comprise receiving an indication in the initial NAS message, the indication indicating whether the mobile device intends to send the message which includes the supplemental NAS information. The method in the network may further comprise decapsulating the initial NAS message from a first layer 2 frame; and decapsulating the message which includes the supplemental NAS information from one or more second layer 2 frames. The first layer 2 frame may comprise a SABM frame.

The method in the network may be performed by a network node comprising one or more processors; a transceiver coupled to the one or more processors; wherein the one or more processors are configured to perform the actions of the methods described above. The network node may be or include an MSC. The method may be performed in accordance with computer instructions stored in a computer readable medium and executable by one or more processors of the network node.

Yet another method in a mobile device for use in communicating NAS information for a NAS procedure comprises sending to a network a dummy NAS message; receiving from the network a response to the dummy NAS message; and after a multiple frame mode of communication has been established, sending to the network a subsequent NAS message associated with a NAS procedure. The dummy NAS message may include NAS information comprising little or no meaningful content (e.g. insufficient) for performing the NAS procedure. The dummy NAS message may include at least one of an identity of the mobile device or classmark information.

The method in the mobile device may further comprise encapsulating the dummy NAS message in a first layer 2 frame for transmission; and encapsulating the subsequent NAS message in one or more second layer 2 frames for transmission. The first layer 2 frame may comprise a SABM frame. The information in the dummy NAS message may have a size limitation imposed by the first layer 2 frame. The NAS information in the subsequent NAS message does not have this size limitation.

The mobile device may comprise an RF transceiver; one or more processors coupled to the RF transceiver; and wherein the one or more processors are configured to perform the steps of the methods described above. The method may be performed in accordance with computer instructions stored in a computer readable medium and executable by one or more processors of the mobile device.

The yet another corresponding method in a network for use in communicating NAS information for a NAS procedure comprises receiving from a mobile device a dummy NAS message; sending to the mobile device a response to the dummy NAS message; and after a multiple frame mode of communication has been established, receiving from the mobile device a subsequent NAS message associated with a NAS procedure. The dummy NAS message may include NAS information comprising little or no meaningful (e.g. insufficient) content for performing the NAS procedure. The dummy NAS message may include at least one of an identity of the mobile device or classmark information.

The method in the network may further comprise causing the NAS procedure to be completed based on NAS information in the subsequent NAS message. The method may comprise causing the NAS procedure to be completed without use of any NAS information in the dummy NAS message. The method may comprise causing the NAS procedure to be completed without use of NAS information in the dummy NAS message, by ignoring or discarding the NAS information in the dummy NAS message. The method in the network may further comprise decapsulating the dummy NAS message from a first layer 2 frame; and decapsulating the subsequent NAS message from one or more second layer 2 frames. The first layer 2 frame may comprise a SABM frame. The information in the dummy NAS message may have a size limitation imposed by the first layer 2 frame. The NAS information in the subsequent NAS message does not have this size limitation.

The method in the network may further be performed by a network node comprising one or more processors; a transceiver coupled to the one or more processors; wherein the one or more processors are configured to perform the actions of the methods described above. The network node may be or include an MSC. The method may be performed in accordance with computer instructions stored in a computer readable medium and executable by one or more processors of the network node.

Yet finally another method in a network for use in communicating supplemental non access stratum (NAS) information, while limiting the occurrences in which status messages are sent, may comprise sending an indication indicating whether supplemental NAS messaging is allowed or supported by the network; receiving from a mobile device an initial NAS message associated with a NAS procedure, the initial NAS message including NAS information; receiving from the mobile device a supplemental NAS message which includes supplemental NAS information; identifying a predetermined message type of the supplemental NAS message; if the network supports the supplemental NAS message for the predetermined message type, then processing the supplemental NAS information for the mobile device; and if the network fails to support the supplemental NAS message for the predetermined message type, then ignoring the supplemental NAS information and refraining from sending a status message to the mobile device. A corresponding method in a mobile device which corresponds to this network method is employed as well.

In an alternative example, a method in a mobile communication device for use in communicating supplemental non access stratum "NAS" information includes sending to a network an initial NAS message whose limited size does not allow communicating supplemental NAS information; and sending to the network a supplemental NAS message containing supplemental NAS information that cannot be communicated within the initial NAS message.

The above-described embodiments of the present application are intended to be examples only. Those of skill in the art may effect alterations, modifications and variations to the particular embodiments without departing from the scope of the application. For example, in some embodiments, more than one supplemental NAS message (e.g. two or more) may be communicated in the techniques. Further, although the terminology "supplemental" is utilized in the present disclosure, other suitable alternative descriptive terminology may be utilized, such as "additional" (e.g. "additional NAS information"), "enhanced" (e.g. "enhanced NAS information"), "extended" (e.g. "extended NAS information"), or message type "2" (e.g. "Location Updating Request 2"), as examples. The invention described herein in the recited claims intends to cover and embrace all suitable changes in technology.

What is claimed is:

1. A method in a mobile communication device for use in communicating supplemental non access stratum (NAS) information, the method comprising:
   sending to a network a first NAS message associated with a NAS procedure, the first NAS message comprising a request to perform a requested operation, wherein the first NAS message includes an indication that a supplemental NAS message associated with the NAS procedure will be sent;
   before receiving a NAS accept message from the network and before sending an access stratum (AS) information message to the network, sending to the network the supplemental NAS message associated with the NAS procedure, the supplemental NAS message containing supplemental NAS information paired with information in the first NAS message to perform the requested operation;
   after or before sending the supplemental NAS message:
      performing an authentication procedure that is distinct from the requested operation, and
      performing a ciphering procedure that is distinct from the requested operation; and
   after sending the supplemental NAS message and after performing the authentication procedure and the ciphering procedure, receiving the NAS accept message indicating completion of the NAS procedure by the network using the first NAS message and the supplemental NAS message.

2. The method of claim 1, further comprising: receiving, by the mobile communication device from the network, an indication indicating whether supplemental NAS messaging is allowed or supported by the network.

3. The method of claim 2, wherein the sending, by the mobile communication device to the network, of the supplemental NAS message for the NAS procedure is in response to the indication indicating that the supplemental NAS messaging is allowed or supported by the network.

4. The method of claim 1, wherein the first NAS message comprises one of a Location Updating Request message, a CM Re-Establishment Request message, a CM Service Request message, a Paging Response message, an IMSI Detach Indication message, a Notification Response message, or an Immediate Setup message.

5. The method of claim 1, further comprising:
   encapsulating, by the mobile communication device, the first NAS message in a first layer 2 frame for transmission; and
   encapsulating, by the mobile communication device, the supplemental NAS message in one or more second layer 2 frames for transmission.

6. The method of claim 5, wherein the first layer 2 frame comprises a Set Asynchronous Balanced Mode (SABM) frame, and the one or more second layer 2 frames comprise one or more Information frames.

7. The method of claim 1, wherein the supplemental NAS message contains supplemental NAS information that supplements NAS information in the first NAS message.

8. The method of claim 1, wherein the supplemental NAS information in the supplemental NAS message conditions an outcome of the requested operation of the NAS procedure.

9. The method of claim 1, further comprising:
   after the sending of the supplemental NAS message by the mobile communication device to the network, sending, by the mobile communication device, the AS information message to the network.

10. A mobile communication device, comprising:
   a radio frequency (RF) transceiver;
   one or more processors coupled to the RF transceiver, the one or more processors being configured to:
      cause a first NAS message associated with a NAS procedure to be sent to a network via the RF transceiver, the first NAS message comprising a request to perform a requested operation of the NAS procedure, wherein the first NAS message includes an indication that a supplemental NAS message associated with the NAS procedure will be sent; and
      before receiving a NAS accept message from the network and before sending an access stratum (AS) information message to the network, cause the supplemental NAS message associated with the NAS procedure to be sent to the network via the RF transceiver, the supplemental NAS message containing supplemental NAS information to be paired with information in the first NAS message to perform the requested operation;
      after or before sending the supplemental NAS message:
         perform an authentication procedure between the mobile communication device and the network, the authentication procedure distinct from the requested operation, wherein the supplemental NAS message is not part of the authentication procedure between the mobile communication device and the network, and
         perform a ciphering procedure that is distinct from the requested operation;
      after sending the supplemental NAS message, send the AS information message to the network; and
      after sending the supplemental NAS message and after performing the authentication procedure and the ciphering procedure, receive the NAS accept message indicating completion of the NAS procedure by the network using the first NAS message and the supplemental NAS message.

11. A method in a network for use in communicating supplemental non access stratum (NAS) information, the method comprising:
receiving, by a network node from a mobile communication device, a first NAS message associated with a NAS procedure, the first NAS message comprising a request to perform a requested operation of the NAS procedure, wherein the first NAS message includes an indication that a supplemental NAS message associated with the NAS procedure will be sent;
before receiving, from the mobile communication device, an access stratum (AS) information message, receiving, by the network node from the mobile communication device, the supplemental NAS message associated with the NAS procedure, the supplemental NAS message containing supplemental NAS information paired with information in the first NAS message to perform the requested operation;
after or before receiving the supplemental NAS message:
performing, by the network node, an authentication procedure distinct from the requested operation with the mobile communication device, and
performing, by the network node, a ciphering procedure distinct from the requested operation with the mobile communication device, wherein the supplemental NAS message is separate from the authentication procedure and the ciphering procedure; and
in response to the authentication procedure and the ciphering procedure, completing the NAS procedure based on NAS information in the first NAS message and the supplemental NAS information in the supplemental NAS message.

12. The method of claim 11, further comprising:
sending, by the network node to the mobile communication device, an indication indicating whether supplemental NAS messaging is allowed or supported by the network.

13. The method of claim 11, further comprising:
identifying, by the network node, the indication in the first NAS message.

14. The method of claim 13, further comprising:
in response to the indication indicating that the mobile communication device will send the supplemental NAS message, receiving, by the network node from the mobile communication device, the supplemental NAS message for the NAS procedure.

15. The method of claim 11, wherein the first NAS message comprises one of a Location Updating Request message, a CM Re-Establishment Request message, a CM Service Request message, a Paging Response message, an IMSI Detach Indication message, a Notification Response message, or an Immediate Setup message.

16. The method of claim 15, wherein the supplemental NAS information in the supplemental NAS message supplements the NAS information in the first NAS message.

17. The method of claim 11, further comprising:
decapsulating, by the network node, the first NAS message from a first layer 2 frame; and
decapsulating, by the network node, the supplemental NAS message from one or more second layer 2 frames.

18. The method of claim 17, wherein the first layer 2 frame comprises a Set Asynchronous Balanced Mode (SABM) frame, and the one or more second layer 2 frames comprise one or more Information frames.

19. A network node, comprising:
one or more processors;
a transceiver coupled to the one or more processors; and
the one or more processors being configured to:
receive from a mobile communication device a first NAS message associated with a NAS procedure, the first NAS message comprising a request to perform a requested operation, wherein the first NAS message includes an indication that a supplemental NAS message associated with the NAS procedure will be sent;
before receiving, from the mobile communication device, an access stratum (AS) information message, receive from the mobile communication device the supplemental NAS message associated with the NAS procedure, the supplemental NAS messages containing supplemental NAS information to be paired with information in the first NAS message to perform the requested operation;
after or before receiving the supplemental NAS message:
perform an authentication procedure distinct from the requested operation with the mobile communication device, wherein the supplemental NAS message is not part of the authentication procedure between the network node and the mobile communication device, and
perform a ciphering procedure distinct from the requested operation with the mobile communication device; and
in response to the authentication procedure and the ciphering procedure, complete the NAS procedure based on NAS information in the first NAS message and the supplemental NAS information in the supplemental NAS message.

20. A method in a network for communicating supplemental non access stratum (NAS) information, the method comprising:
sending, by a network node, an indication indicating whether supplemental NAS messaging is allowed or supported by the network;
receiving, by the network node from a mobile communication device, a NAS message associated with a NAS procedure, the NAS message including NAS information to perform a requested operation, wherein the NAS message includes an indication that a supplemental NAS message associated with the NAS procedure will be sent;
before receiving, from the mobile communication device, an access stratum (AS) information message, receiving, by the network node from the mobile communication device, the supplemental NAS message which includes supplemental NAS information paired with the NAS information in the NAS message to perform the requested operation;
after or before receiving the supplemental NAS message, performing, by the network node, an authentication procedure between the network node and the mobile communication device, and performing a ciphering procedure, the supplemental NAS message separate from the authentication procedure and the ciphering procedure; and
identifying, by the network node, a predetermined message type of the NAS message;

if the network supports the supplemental NAS message for the predetermined message type, then after the authentication procedure and the ciphering procedure, processing, by the network node, the supplemental NAS information for the mobile communication device to complete the NAS procedure based on the NAS information in the NAS message and the supplemental NAS information in the supplemental NAS message; and if the network fails to support the supplemental NAS message for the predetermined message type, then ignoring, by the network node, the supplemental NAS information and refraining from sending an error status message to the mobile communication device.

* * * * *